(12) United States Patent
Ishikawa et al.

(10) Patent No.: US 12,496,461 B2
(45) Date of Patent: Dec. 16, 2025

(54) TREATMENT SUPPORT SYSTEM AND TREATMENT SUPPORT DEVICE

(71) Applicant: Shimadzu Corporation, Kyoto (JP)

(72) Inventors: Akihiro Ishikawa, Kyoto (JP);
Masumi Kawai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 297 days.

(21) Appl. No.: 18/021,928

(22) PCT Filed: Feb. 24, 2021

(86) PCT No.: PCT/JP2021/006922
§ 371 (c)(1),
(2) Date: Feb. 17, 2023

(87) PCT Pub. No.: WO2022/038806
PCT Pub. Date: Feb. 24, 2022

(65) Prior Publication Data
US 2023/0302291 A1    Sep. 28, 2023

(30) Foreign Application Priority Data
Aug. 19, 2020   (JP) ................................ 2020-138909

(51) Int. Cl.
*A61N 5/06*   (2006.01)
(52) U.S. Cl.
CPC .................... *A61N 5/062* (2013.01)
(58) Field of Classification Search
CPC ............ A61N 5/062; A61N 2005/0626; A61N 2005/0662; A61N 5/06–2005/073; A61B 10/00; G01N 21/64
See application file for complete search history.

(56) References Cited

U.S. PATENT DOCUMENTS

| | | | |
|---|---|---|---|
| 6,214,033 B1* | 4/2001 | Ii ............................ | A61N 5/062 604/20 |
| 7,016,718 B2* | 3/2006 | Ii ............................ | A61N 5/062 600/475 |

(Continued)

FOREIGN PATENT DOCUMENTS

| | | |
|---|---|---|
| JP | 2014523907 A | 9/2014 |
| JP | 2014221117 A | 11/2014 |

(Continued)

OTHER PUBLICATIONS

Notice of Reasons for Refusal dated Oct. 24, 2023 for corresponding Japanese Patent Application No. 2022-543270.

(Continued)

*Primary Examiner* — Jonathan T Kuo
(74) *Attorney, Agent, or Firm* — Muir Patent Law, PLLC (57) ABSTRACT

This treatment support system (100) is provided with an irradiation unit (10) for irradiating a medical agent (102) administered to a subject of a cancer subject (101) with therapeutic light in treatment for killing a cancer cell by irradiating the medical agent with the therapeutic light, a light detection unit (30) for detecting fluorescence excited by the therapeutic light, a control unit (51), and a display unit (60). The control unit (51) includes a signal acquisition unit (51*a*) for acquiring a fluorescence signal, an analysis processing unit (51*c*) for generating the analysis image (203) that displays a treatment progress distribution for each region of the treatment site based on a change along time series of the fluorescence signal, and an image output unit (51*d*) for outputting the analysis image (203).

12 Claims, 6 Drawing Sheets

(56) References Cited

U.S. PATENT DOCUMENTS

| | | | |
|---|---|---|---|
| 9,824,444 B2* | 11/2017 | Kubo | A61B 1/00009 |
| 2003/0036785 A1* | 2/2003 | Ii | A61N 5/062 |
| | | | 600/476 |
| 2003/0055341 A1* | 3/2003 | Banerjee | G01N 33/533 |
| | | | 600/476 |
| 2012/0010558 A1 | 1/2012 | Kobayashi et al. | |
| 2013/0336995 A1 | 12/2013 | Kobayashi et al. | |
| 2014/0120119 A1 | 5/2014 | Kobayashi et al. | |
| 2016/0015829 A1 | 1/2016 | Kobayashi et al. | |
| 2016/0113573 A1 | 4/2016 | Arai et al. | |
| 2016/0157763 A1* | 6/2016 | Tominaga | A61B 1/0646 |
| | | | 600/317 |
| 2017/0032521 A1* | 2/2017 | Kubo | A61B 1/00009 |
| 2020/0085950 A1 | 3/2020 | Kobayashi et al. | |
| 2020/0095331 A1 | 3/2020 | Kobayashi et al. | |
| 2022/0288210 A1 | 9/2022 | Kobayashi et al. | |
| 2023/0050584 A1 | 2/2023 | Kobayashi et al. | |

FOREIGN PATENT DOCUMENTS

| | | |
|---|---|---|
| WO | 2015045516 A1 | 4/2015 |
| WO | 2019215800 A1 | 11/2019 |
| WO | 2019215905 A1 | 11/2019 |

OTHER PUBLICATIONS

Written Opinion by the International Searching Authority for PCT application No. PCT/JP2021/006922, dated Apr. 27, 2021.

* cited by examiner

TREATMENT SUPPORT SYSTEM AND TREATMENT SUPPORT DEVICE

TECHNICAL FIELD

The present invention relates to a treatment support system and a treatment support device.

BACKGROUND ART

Conventionally, a treatment support device is known in which support of a medical treatment (photoimmunotherapy) or the treatment for killing cancer cells by irradiating a medical agent containing a fluorescent material administered to a body of a subject with therapeutic light in a predetermined wavelength range is performed. For example, such a treatment support device is disclosed in WO2019/215905.

The treatment support device described in the above-described WO 2019/215905 is provided with a fluorescence detection unit for detecting fluorescence and a fluorescence image generation unit for generating a fluorescence image based on the fluorescence signal output from the fluorescence detection unit. The fluorescence detection unit detects the fluorescence emitted from the fluorescent material of the medical agent administered to the body of the subject for treatment by photoimmunotherapy. The treatment support device described in the above-described WO2019/215905 is configured to output a fluorescence image generated by the fluorescence image generation unit before treatment and a fluorescence image generated by the fluorescence image generation unit after treatment. The treatment support device described in the above-described WO2019/215905 displays a fluorescence image before treatment and a fluorescence image after treatment in a superimposed manner.

PRIOR ART DOCUMENT

Patent Document

Patent Document 1: International Publication No. WO2019/215905

SUMMARY OF THE INVENTION

Problems to be Solved by the Invention

Here, in the treatment support device described in the above-described WO2019/215905, in some cases, there are variations in the treatment progress in each region of cancer cells (treatment site). That is, the treatment site sometimes includes a region with a relatively advanced treatment progress and a region with a relatively less-advanced treatment progress. Therefore, it is required to confirm the specific variation (difference) of the treatment progress for each region of the treatment site. In photoimmunotherapy, fluorescence emitted from a fluorescent material gradually decreases as the treatment progresses. Therefore, in order to confirm the treatment progress, it is necessary to confirm the attenuation of the fluorescence.

However, according to the treatment support device described in the above-described WO2019/215905, although it is possible to confirm the difference between the regions where the fluorescence is detected by displaying the fluorescence image before treatment and the fluorescence image after treatment in a superimposed manner, it is necessary for a person to confirm the intensity of the fluorescence by directly visually recognizing the image in order to confirm the variance of the treatment progress in each region of the treatment site. For this reason, such a confirmation operation for confirming the difference of the specific treatment progress for each region of the treatment site is a burden on an operator, such as, e.g., a doctor. Under the circumstance, in order to confirm the specific variation (difference) of the treatment progress, it is desired to easily recognize the treatment progress in each region of the treatment site of the subject.

The present invention has been made to solve the above-described problems, and an object of the present invention is to provide a treatment support system and a treatment support device capable of easily recognizing treatment progress for each region of a treatment site of a subject.

Means for Solving the Problems

A treatment support system according to a first aspect of the present invention includes:
    an irradiation unit configured to irradiate a medical agent administered to a treatment site in a body of a subject with therapeutic light in a predetermined wavelength range in treatment, the medical agent containing a fluorescent material, the treatment being performed to kill cancer cells by irradiating the medical agent with the therapeutic light;
    a light detection unit configured to detect fluorescence emitted from the fluorescent material of the medical agent excited by the therapeutic light emitted from the irradiation unit;
    a control unit configured to analyze a fluorescence signal of the fluorescence detected by the light detection unit to generate an analysis image; and
    a display unit configured to display the analysis image generated by the control unit,
    wherein the control unit includes:
    a signal acquisition unit configured to acquire the fluorescence signal detected by the light detection unit;
    an analysis processing unit configured to generate the analysis image based on time-series changes of the fluorescence signal acquired by the signal acquisition unit, the analysis image displaying a treatment progress distribution for each region of the treatment site in an identifiable manner; and
    an image output unit configured to output the analysis image generated by the analysis processing unit.

A treatment support device according to a second aspect of the present invention, comprising:
    a light detection unit configured to detect fluorescence emitted from a fluorescent material of a medical agent administered to a treatment side in a body of a subject by being excited by therapeutic light in a predetermined wavelength range in a treatment for killing cancer cells by irradiating the medical agent with the therapeutic light; and
    a control unit configured to generate an analysis image by analyzing a fluorescence signal detected by the light detection unit,
    wherein the control unit includes:
    a signal acquisition unit configured to acquire the fluorescence signal detected by the light detection unit;
    an analysis processing unit configured to generate the analysis image that identifiably displays a treatment progress distribution for each region of the treatment site based on time-series changes of the fluorescence signal acquired by the signal acquisition unit; and an image output unit configured to output the analysis image generated by the analysis processing unit.

Effects of the Invention

In the treatment support system according to the first aspect of the present invention and the treatment support device according to the second aspect of the present invention, an analysis image that identifiably shows the treatment progress distribution for each region of the treatment site is generated based on the change in the acquired time-series fluorescence signal. Then, the generated analysis image is output. With this, even in a case where the treatment progress differs for each region of the treatment site, it is possible to identify the treatment progress distribution based on the time-series fluorescence changes. Therefore, unlike the case where a person directly confirms an image indicating the intensity of the fluorescence signal, it is possible to easily identify the treatment progress distribution for each region of the treatment site by visually recognizing the analysis image. Consequently, it is possible to provide a treatment support system and a treatment support device capable of easily recognizing treatment progress for each region of a treatment site of a subject.

EMBODIMENTS FOR CARRYING OUT THE INVENTION

Hereinafter, some embodiments in which the present invention is embodied will be described with reference to the attached drawings.

With reference to FIG. 1 to FIG. 8, a configuration of a treatment support system 100 according to one embodiment of the present invention will be described.

Figure 1:
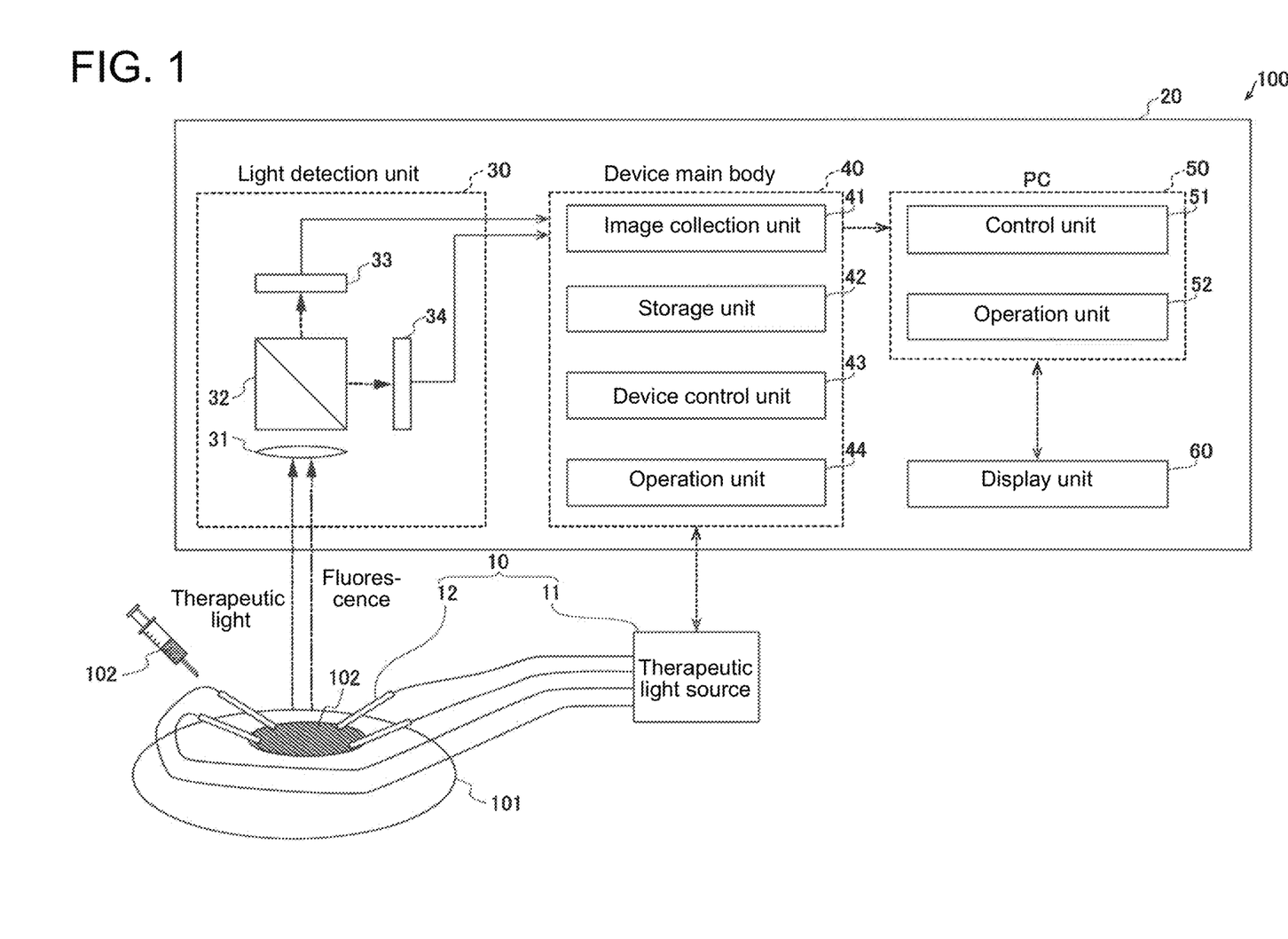
FIG. 1 is a block diagram showing an entire configuration of a treatment support system according to one embodiment.

As shown in FIG. 1, the treatment support system 100 according to this embodiment is a system for supporting treatment in photoimmunotherapy. Specifically, the treatment support system 100 is configured to irradiate a treatment site of a cancer patient 101 with therapeutic light (excitation light) to detect the fluorescence emitted from a fluorescent material of a medical agent 102 administered to a body of the cancer patient 101. The treatment support system 100 is configured to, in addition to support the treatment by photoimmunotherapy, perform the treatment by photoimmunotherapy by continuously irradiating the fluorescent material of the medical agent 102 with the therapeutic light in a certain wavelength range according to the fluorescent material of the medical agent 102. Note that the cancer patient 101 is one example of the "subject" recited in claims. The cancer patient 101 may be an animal other than a human.

The treatment support system 100 according to this embodiment includes an irradiation unit 10 and a treatment support device 20, as shown in FIG. 1.

(Configuration of Irradiation Unit)

In this embodiment, the irradiation unit 10 is configured to irradiate the medical agent 102 at a treatment site with therapeutic light in treatment for killing cancer cells by irradiating the medical agent 102 containing a fluorescent material administered to the body of the cancer patient 101 with the therapeutic light in a predetermined wavelength range. That is, the irradiation unit 10 is configured to irradiate the medical agent 102 containing the fluorescent material administered to the body of the cancer patient 101 with the therapeutic light (excitation light) in the treatment by photoimmunotherapy. Further, the irradiation unit 10 is configured to initiate and end irradiation of the therapeutic light (ON/OFF switching of the therapeutic light irradiation) based on the signal from the device control unit 43, which will be described later. The irradiation unit 10 includes a therapeutic light source 11 and a plurality of treatment probes 12.

The therapeutic light source 11 is configured to emit therapeutic light (excitation light) in a specific wavelength range for exciting the fluorescent material contained in the medical agent 102. The therapeutic light source 11 includes a semiconductor laser diode (LD: Laser Diode), a light-emitting diode (LED: Light Emitting Diode), or the like.

The treatment probe 12 is configured to be inserted into the body of the cancer patient 101 to emit the therapeutic light within the body of the cancer patient 101. The treatment probe 12 includes an optical fiber for guiding the light from the therapeutic light source 11. The treatment probe 12 is configured to be inserted, for example, along a diffuser (not shown) toward a treatment location (treatment site) within the body of the cancer patient 101. The diffuser is a tubular guide formed of a transparent member, such as, e.g., a glass member, that is to be inserted into the body of the cancer patient 101.

A user, such as, e.g., a doctor, grasps the position (treatment site) of the cancer of the cancer patient 101 in advance by an MRI (Magnetic Resonance Image), an X-ray CT (Computed Tomography), or ultrasonic wave echoes. The user, such as, e.g., a doctor, inserts the treatment probe 12 into the body of the cancer patient 101 while confirming the position of the cancer with the help of ultrasonic wave echoes or the like. The treatment probe 12 guides and emits the therapeutic light from the therapeutic light source 11 in the body of the cancer patient 101. With this, the fluorescent material of the medical agent 102 is excited by the therapeutic light.

The treatment support system 100 performs the treatment (photoimmunotherapy) for killing cancer cells by continuously emitting the therapeutic light, which is light in a predetermined wavelength range for exciting the fluorescent material contained in the medical agent 102 in the body of the cancer patient 101 by the treatment probe 12.

(Photoimmunotherapy)

In photoimmunotherapy, the medical agent 102 is administered in advance (e.g., 1 to 2 days ago) into the body of the cancer patient 101 prior to emitting the therapeutic light. The medical agent 102 contains a fluorescent material that emits fluorescence, and antibodies. The medical agent 102 is selectively coupled to the cancer cells (treatment site) of the cancer patient 101. The fluorescent material of the medical agent 102 is a substance that is excited to emit fluorescence by being irradiated with the therapeutic light and a substance that causes a photochemical reaction by being continuously irradiated with the therapeutic light. That is, when the the medical agent 102 selectively integrated in the treatment site of the cancer patient 101 is irradiated with the therapeutic light, the cancer cells are destroyed while emitting fluorescence light in the treatment site. The fluorescent material is a chemical substance, such as, e.g., an IRDye (registered mark) 700DX.

In the treatment by photoimmunotherapy, therapeutic light corresponding to the type of the fluorescent material administered to the cancer patient 101 is emitted onto the treatment site (cancer cells) of the cancer patient 101 by the irradiation unit 10. That is, the wavelength of the therapeutic light to be emitted by the irradiation unit 10 is determined so as to correspond to the type of the fluorescent material of the medical agent 102. The intensity and the irradiation time of the therapeutic light to be irradiated are determined by a user, such as, e.g., a doctor.

Note that the therapeutic light to be emitted by the irradiation unit 10 during the treatment is light in a wavelength range in which the fluorescent material of the medical agent 102 used for the treatment causes a photochemical reaction in a wavelength region from 600 nm or mor and 2,500 nm or less, which is region from a part of visible light to near-infrared light. Therefore, the wavelength of the therapeutic light varies depending on the type of the fluorescent material of the medical agent 102 used for the treatment. For example, in a case where an IRDye700DX is used for the fluorescent material of the medical agent 102, the irradiation unit 10 emits light having a wavelength peak position of 600 nm or more and 700 nm or less during the treatment by photoimmunotherapy. The irradiation unit 10 emits, for example, non-thermal red light (near-infrared light) having a wavelength peak position of about 690 nm.

(Configuration of Treatment Support Device)

The treatment support device 20 of the treatment support system 100 is provided with a light detection unit 30, a device main body 40, and a PC 50 (personal computer).

In this embodiment, the light detection unit 30 detects the fluorescence emitted from the fluorescent material of the medical agent 102 excited by the therapeutic light emitted from the irradiation unit 10. Specifically, the light detection unit 30 detects the fluorescence from the treatment site including cancer cells of the cancer patient 101. The light detection unit 30 includes a lens 31, a prism 32, a fluorescence sensor 33, and a visible light sensor 34. Note that the visible light sensor 34 is one example of the "imaging unit" recited in claims.

The lens 31 is configured such that the fluorescence emitted by the fluorescent material of the medical agent 102 and the visible light are incident thereon. The fluorescence and the visible light incident on the lens 31 are converged by the lens 31 and incident on the prism 32.

The prism 32 is configured to separate the incident light. That is, the fluorescence and the visible light incident on the lens 31 are separated by the prism 32. The fluorescence separated by the prism 32 is configured to be imaged by the fluorescence sensor 33. The visible light separated by the prism 32 is configured to be imaged by the visible light sensor 34.

The fluorescence sensor 33 is configured to image (detect) the fluorescence emitted by the fluorescent material of the medical agent 102 excited by the therapeutic light radiation, as an image. The fluorescence sensor 33 includes an image sensor that detects the fluorescence separated by the prism 32 and outputs a fluorescence signal based on the detected fluorescence. The image sensor converts the fluorescence into an electric signal by photoelectric conversion. The image sensor is, for example, a CMOS (Complementary Metal Oxide Semiconductor) image sensor, or a CCD (Charge Coupled Device) image sensor.

Further, the fluorescence sensor 33 includes an optical filter that selectively transmits light in a region including the wavelength range of the fluorescence emitted by the fluorescent material of the medical agent 102. That is, the fluorescence sensor 33 is configured to selectively detect the fluorescence from the fluorescent material of the medical agent 102. For example, in a case where IRDye700DX is used for the fluorescent material of the medical agent 102, the fluorescence sensor 33 is configured to detect the light having a wavelength of 700 nm or more by the wavelength selectivity of the optical filter. Note that the IRDye700DX is excited by the light having a wavelength of 600 nm or more and 700 nm or less to emit light having a peak at a wavelength of about 700 nm or about 770 nm, as fluorescence.

Figure 2:
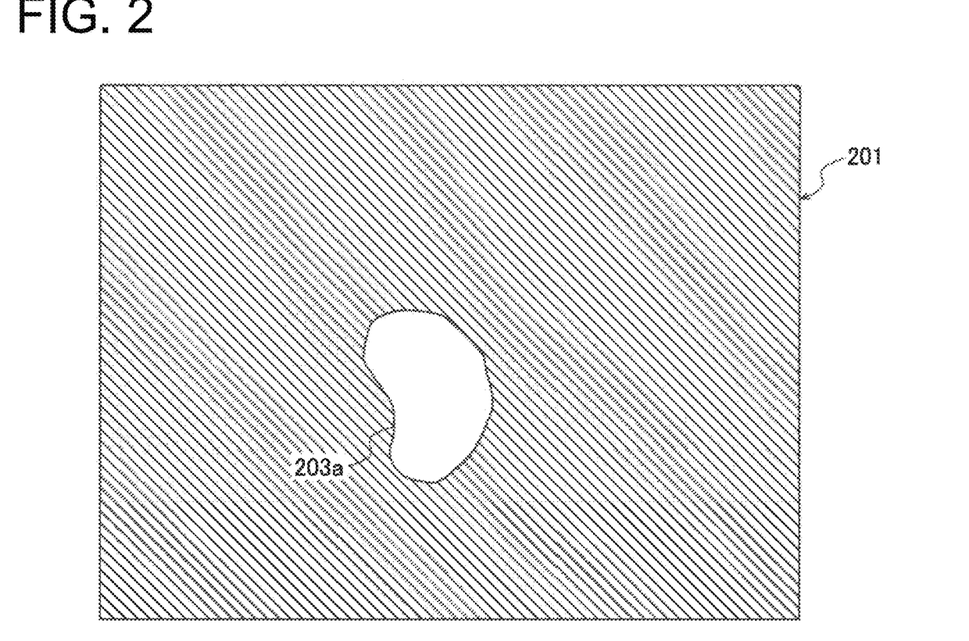
FIG. 2 is a diagram showing one example of a fluorescence image according to one embodiment.

Further, as shown in FIG. 2, the fluorescence sensor 33 is configured to output a fluorescence signal as picture information representing the intensity distribution of the detected fluorescence. Specifically, the fluorescence sensor 33 is configured to output the data of the fluorescence image 201 in which the intensity distribution of the detected fluorescence is represented to correspond to the pixel value of each pixel, as a fluorescence signal. That is, the fluorescence sensor 33 is configured to capture the fluorescence image 201 representing the intensity distribution state of the fluorescence in the treatment site of the cancer patient 101.

The fluorescence image 201 is configured to represent the intensity of the fluorescence from the treatment site of the region corresponding to each pixel by, for example, pixel values (luminance values) of 256 steps from 0 to 255. That is, in the fluorescence image 201, a relatively bright (white) region (treatment site region 203a described later) indicates a region with strong fluorescence intensity, and a relatively dark (black) region indicates a region with weak fluorescence intensity.

Figure 3:
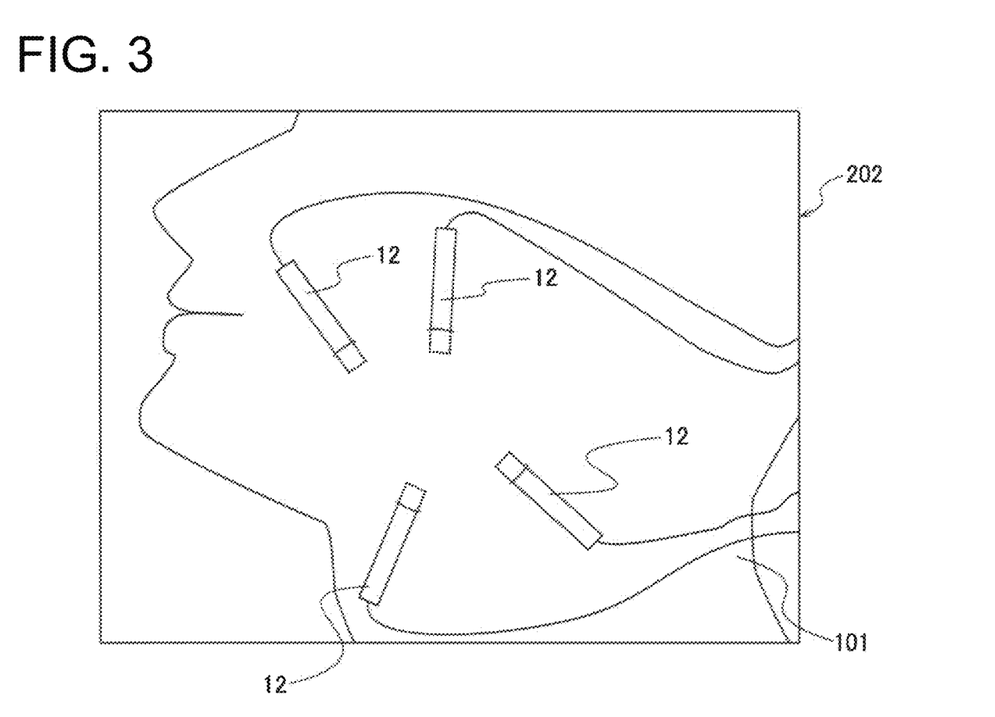
FIG. 3 is a diagram showing one example of a visible image according to one embodiment.

Also, as shown in FIG. 3, the visible light sensor 34 is configured to image (detect) visible light. The visible light sensor 34 includes an image sensor that detects visible light separated by the prism 32 and outputs the visible light signal based on the detected visible light. The image sensor converts the visible light into an electric signal by photoelectric conversion. The imaging element is, for example, a CMOS image sensor, a CCD image sensor, or the like.

Further, the visible light sensor 34 includes an optical filter that selectively transmits light having wavelengths of, for example, red, green, and blue (wavelengths of RGB). The visible light sensor 34 is configured to capture a visible image 202, which is a color picture, by detecting visible light including light of red, green, and blue wavelengths. The visible light sensor 34 is configured to output the data of the visible image 202 as a visible light signal. Further, the visible light sensor 34 is configured to image the visible light guided by the lens 31 common to the fluorescence sensor 33, thereby capturing the visible image 202 corresponding to a region common to the fluorescence image 201.

The device main body 40 includes an image collection unit 41, a storage unit 42, a device control unit 43, and an operation unit 44. The device main body 40 is electrically connected to the irradiation unit 10, the light detection unit 30, and the PC 50, and is configured to transmit and receive signals.

The image collection unit 41 is configured to acquire a fluorescence signal (data of the fluorescence image 201) detected by the fluorescence sensor 33 and a visible light signal (data of the visible image 202) detected by the visible light sensor 34, as electric signals. The image collection unit 41 is configured to continuously acquire the fluorescence signal and the visible light signal along time series. For example, the image collection unit 41 acquires the fluorescence signal and the visible light signal every 100 ms (milliseconds) and generates the fluorescence image 201 and the visible image 202 based on the acquired fluorescence signal and the acquired visible light signal. The image collection unit 41 is configured to store the generated fluorescence image 201 and visible image 202 in the storage unit 42. The image collection unit 41 includes a signal processing circuit or a processor, such as, e.g., an FPGA (Field-Programmable Gate Array) or a GPU (Graphics Processing Unit) configured for image processing.

The storage unit 42 is configured to store the fluorescence signal of the fluorescence detected by the light detection unit 30 and the visible light signal of the visible light detected by the light detection unit 30. That is, the storage unit 42 is configured to memorize (store) the fluorescence signal and the visible light signal (data of the fluorescence image 201 and the visible image 202) acquired by the image collection unit 41. The storage unit 42 memorizes (stores), for example, the fluorescence signal and the visible light signal (data of the fluorescence image 201 and the visible image 202) continuously acquired by the image collection unit 41 along time series.

The storage unit 42 includes, for example, a non-volatile memory, a hard disk drive (HDD: Hard Disk Drive), or an SSD (Solid State Drive). Note that the storage unit 42 may include a database on a network connected by a network provided outside the treatment support device 20. Further, the storage unit 42 stores programs used for the processing of controlling the treatment support device 20 by the device control unit 43.

The device control unit 43 is a computer including a control board (circuit board) on which a CPU (Central Processing Unit), a ROM (Read Only Memory), a RAM (Random Access Memory), and the like are mounted. The device control unit 43 is configured to control the entire treatment support device 20. For example, the device control unit 43 outputs a signal for causing the image collection unit 41 to acquire a fluorescence signal and a visible light signal. The device control unit 43 outputs a signal for causing the irradiation unit 10 to emit therapeutic light.

The operation unit 44 is a user interface for operating the treatment support device 20. The operation unit 44 includes, for example, a remote controller, a touch panel, a keyboard, a mouse, or the like. Specifically, the operation unit 44 is configured to accept operations related to the control by the device control unit 43, such as, e.g., an operation for detecting fluorescence (acquisition of a fluorescence signal), an operation for detecting visible light (acquisition of visible light), and an operation for irradiating therapeutic light.

The PC 50 is provided separately from the device main body 40. The PC 50 is a general-purpose computer. The PC 50 includes a control unit 51 and an operation unit 52.

The control unit 51 includes a CPU, a ROM, a GPU, and a RAM. The control unit 51 is configured to analyze the fluorescence signal of the fluorescence and the visible signal of the visible light detected by the light detection unit 30 (data of the fluorescence image 201 and the visible image 202) to generate an analysis image 203 (see FIG. 7) described below. The control processing by the control unit 51 will be described later.

Like the operation unit 44, the operation unit 52 is a user interface for operating the treatment support device 20. The operation unit 52 includes, for example, a remote controller, a touch panel, a keyboard, a mouse, or the like. The operation unit 52 is configured to accept operations on the control unit 51 that analyzes the fluorescence signal and the visible light (data of the fluorescence image 201 and the visible image 202). Note that the operation on the device control unit 43 and the operation on the control unit 51 may be accepted by the same operation unit.

The display unit 60 is configured by, for example, a liquid crystal display or an organic EL (electroluminescence) display. The display unit 60 is connected to a control unit 51 (PC 50) by a video interface, such as, e.g., an HDMI (registered trademark). The display unit 60 displays an analysis image 203 (see FIG. 7) generated by the control unit 51, which will be described later.

(Generation of Analysis Image by Control Unit)

Figure 4:
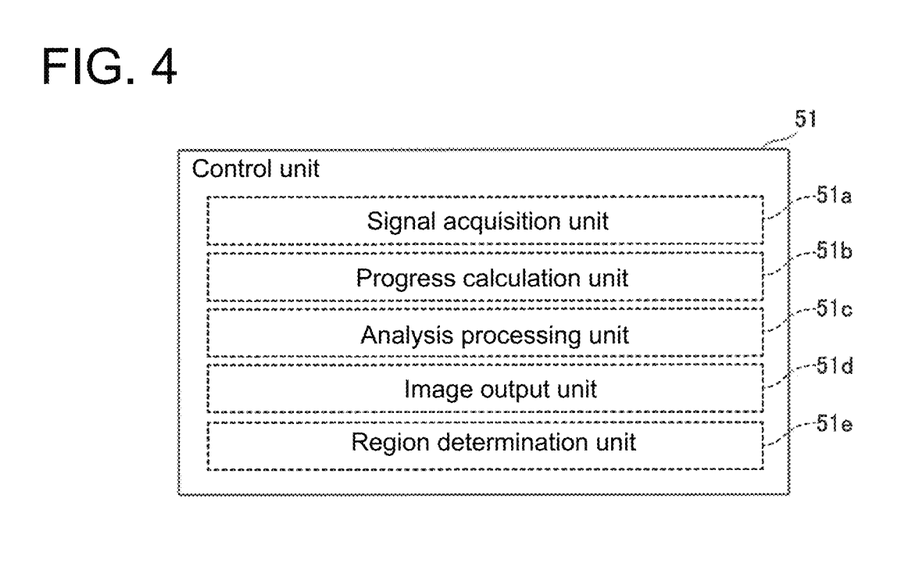
FIG. 4 is a diagram for describing a functional configuration of a control unit according to one embodiment.

As shown in FIG. 4, the control unit 51 include, as functional configurations, a signal acquisition unit 51a, a progress calculation unit 51b, an analysis processing unit 51c, an image output unit 51d, and a region determination unit 51e. That is, the control unit 51 functions as the signal acquisition unit 51a, the progress calculation unit 51b, the analysis processing unit 51c, the image output unit 51d, and the region determination unit 51e by executing programs. Further, the signal acquisition unit 51a, the progress calculation unit 51b, the analysis processing unit 51c, the image output unit 51d, and the region determination unit 51e are functional blocks as software in the control unit 51, and are configured to function based on command signals of the control unit 51 as hardware.

In this embodiment, the signal acquisition unit 51a (control unit 51) in the treatment support system 100 (treatment support device 20) acquires the fluorescence signal detected by the light detection unit 30. Specifically, the signal acquisition unit 51a acquires a fluorescence signal detected by the light detection unit 30 by acquiring the data of the fluorescence image 201 stored in the storage unit 42 by the image collection unit 41. Similarly, the signal acquisition unit 51a acquires the visible image 202 (visible light signal) stored in the storage unit 42 to thereby acquire the visible light signal of the visible light captured by the visible light sensor 34.

Figure 5:
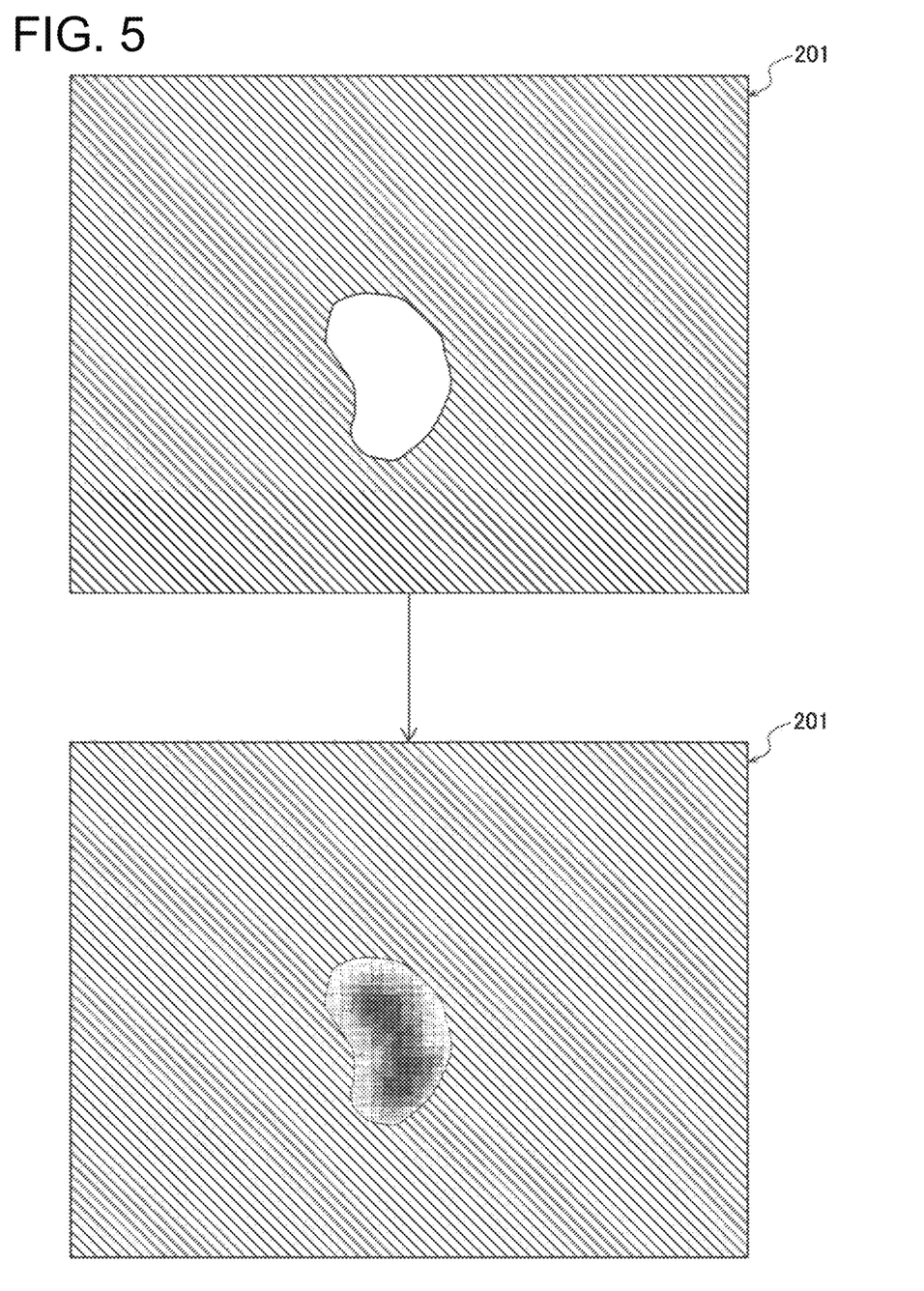
FIG. 5 is a diagram for explaining a change in intensity of a fluorescence signal according to one embodiment.

Here, as shown in FIG. 5, as the treatment progresses by emitting the therapeutic light from the irradiation unit 10, the photochemical reaction of the fluorescent material of the medical agent 102 gradually decreases. That is, when the cancer cells at the treatment site of the cancer patient 101 are destroyed as the treatment progresses, the fluorescence from the medical agent 102 will not be generated (will attenuate). Therefore, in the fluorescence image 201, the region where the fluorescence intensity has decreased over time is a region where the treatment has progressed (has been completed). In other words, the treatment site of the cancer patient 101 corresponding to the region attenuated in the pixel value (luminance value) in the fluorescence image 201 is a site where the treatment is proceeding (has been completed).

Figure 6:
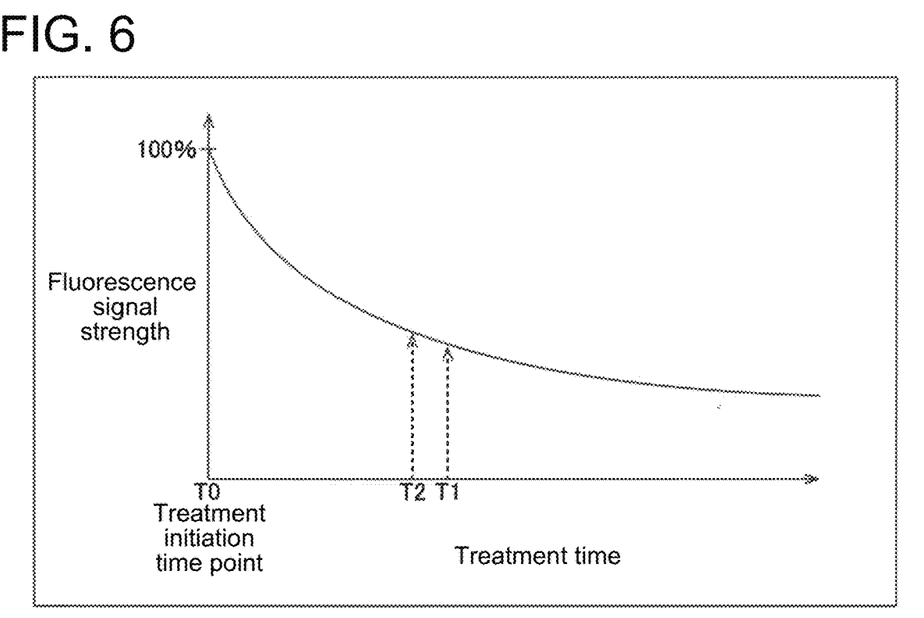
FIG. 6 is a diagram showing one example of a change in fluorescence signal strength from before the treatment initiation to after the treatment initiation.

For example, as shown in FIG. 6, in the fluorescence image 201, the pixel value (luminance value) for one pixel corresponding to the treatment site (cancer cells) attenuates over time. The signal acquisition unit 51a (control unit 51) acquires a change in the intensity of the fluorescence signal along time series in each region of the treatment site of the cancer patient 101 by continuously acquiring the fluorescence image 201 taken along the course of the treatment time. Note that the intensity of the fluorescence from a site other than cancer cells does not change over time because no medical agent 102 exists.

Specifically, the signal acquisition unit 51a (control unit 51) acquires the information in which the intensity of the fluorescence from each region of the treatment site of the cancer patient 101 is represented by a value ranging from 0 to 255, as image information, by acquiring the fluorescence image 201. That is, the signal acquisition unit 51a acquires the intensity of the fluorescence in each region of the treatment site at the time point at which the fluorescence image 201 is captured, by acquiring the fluorescence image 201.

Further, the progress calculation unit 51b (control unit 51) is configured to acquire time-series changes in the fluorescence intensity in each pixel of the fluorescence image 201, based on the change in the pixel value of each pixel of the plurality of fluorescence images 201 acquired along the time series by the signal acquisition unit 51a.

Specifically, the progress calculation unit 51b (control unit 51) calculates (acquires) the value indicating the treatment progress for each region of the treatment site, based on the attenuation rate of the fluorescence signal acquired along time series, with reference to the time point (treatment initiation time point T0) at which acquisition of the fluorescence signal is initiated. For example, when calculating the treatment progress for each region of the treatment site based on the fluorescence image 201 acquired at the time point T1 shown in FIG. 6, the progress calculation unit 51b compares the pixel value (luminance value) of each pixel of the fluorescence image 201 at the treatment initiation time point T0 and the pixel value of each pixel of the fluorescence image 201 acquired at the time point T1. Specifically, the progress calculation unit 51b acquires (calculates) the ratio (value of the ratio) of the pixel value of each pixel of the fluorescence image 201 at the time point T1, assuming that the pixel value of each pixel of the fluorescence image 201 at the treatment initiation time point T0 is 100. That is, the progress calculation unit 51b acquires the treatment progress at each pixel of the fluorescence image 201 from the attenuation rate (percentage) of the intensity of the fluorescence at the time point T1 based on the fluorescence intensity at the treatment initiation time point T0.

The progress calculation unit 51b (control unit 51) acquires the treatment progress as a numerical value from 1 to 100, for example. Specifically, the progress calculation unit 51b acquires, as the treatment progress, a value obtained by subtracting the attenuation rate (percentage) of the fluorescence intensity of the fluorescence image 201 from 100. For example, in a region where the fluorescence intensity is attenuated by 20% as compared with that at the treatment initiation time point T0, it is acquired such that the progress is 20, in a region where the fluorescence intensity is attenuated by 60% as compared with that at the treatment initiation time point T0, it is acquired such that the progress is 60.

Figure 7:
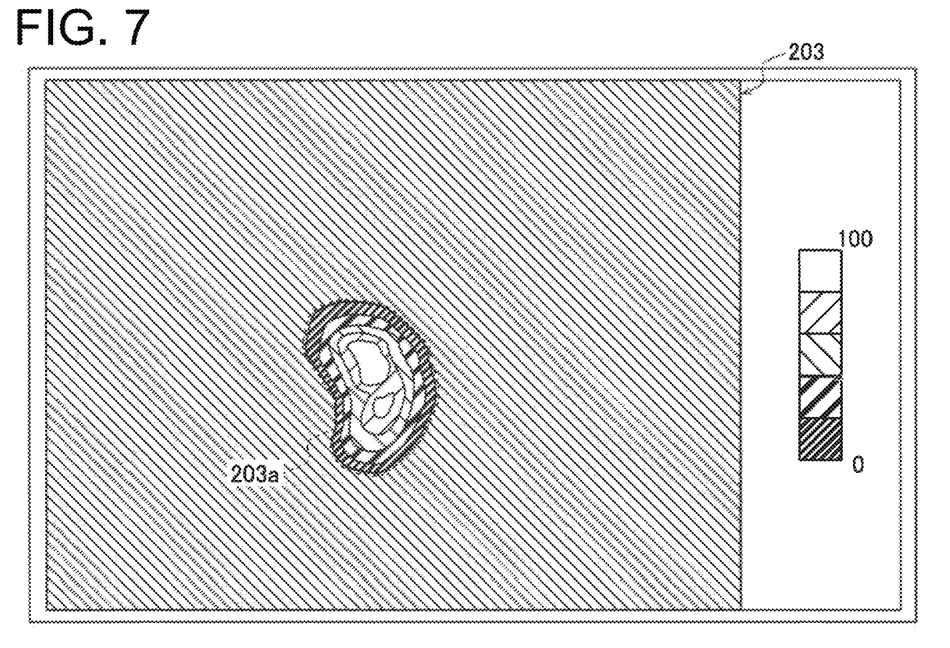
FIG. 7 is a diagram showing one example of an analysis image according to one embodiment.

Then, as shown in FIG. 7, in this embodiment, the analysis processing unit 51c (control unit 51) generates an analysis image 203 that identifiably displays the treatment progress distribution for each region of the treatment site, based on the time-series changes of the fluorescence signal. In detail, the analysis processing unit 51c is configured to generate an analysis image 203 such that each pixel value of the pixels in the analysis image 203 corresponds to the treatment progress distribution for each region of the treatment site. Specifically, in this embodiment, the analysis processing unit 51c is configured to generate the analysis image 203 that identifiably displays the treatment progress distribution for each region of the treatment site, based on the attenuation rate of the fluorescence signal acquired along time series, with reference to the time point (treatment initiation time point T0) at which acquisition of the fluorescence signal is initiated.

Further, in this embodiment, the analysis processing unit 51c (control unit 51) is configured to generate the analysis image 203 colored to correspond to the treatment progress distribution for each region of the treatment site. Specifically, the analysis processing unit 51c is configured to generate the analysis image 203 colored to indicate the treatment progress distribution for each region of the treatment site by the change in hue. The analysis processing unit 51c is configured to generate the analysis image 203 of a stepwise gradation display to indicate the treatment progress distribution for each region of the treatment site in a stepwise manner.

For example, the analysis processing unit 51c generates the analysis image 203 such that the progress is color-coded by five stages. Specifically, the analysis image 203 is colored to be red when the progress is 0 or more and less than 20, orange when the progress is 20 or more and less than 40, yellow when the progress is 40 or more and less than 60, and green when progress is 60 or more and less than 80. Note that in FIG. 7, the color coding of the analysis image 203 is indicated by the difference in hatching.

The analysis processing unit 51c (control unit 51) is configured to generate the analysis image 203 such that when the value indicating the treatment progress exceeds a completion threshold indicating that the treatment has been completed in each region of the treatment site, the region is identifiably displayed as a region where the treatment has been completed. For example, the analysis processing unit 51c sets such that the progress of 80 is a completion threshold. Then, the analysis processing unit 51c displays, in the analysis image 203, the pixel (region) having the treatment progress of 80 or more in white in an identifiable manner, as a region where the treatment has been completed.

Further, the analysis processing unit 51c is configured such that the analysis image 203 can be switched from a display colored to correspond to the treatment progress to a black-and-white (grayscale) display based on the operation of the operation unit 52. Further, the analysis processing unit 51c is configured such that the analysis image 203 can be switched smoothly (continuously) to correspond to the treatment progress from the stepwise gradation display by changing the pixel value, based on the operation of the operation unit 52. For example, the analysis processing unit 51c is configured to generate and output a grayscale analysis image 203 in which the treatment progress for each region of the treatment site is converted to correspond to the luminance value of each pixel. It should be noted that the analysis processing unit 51c may be configured to display the analysis image 203 in such a manner that a completion threshold is provided and that a region where the progress exceeds a completion threshold is displayed as a region where the treatment has been completed in an identifiable manner (e.g., by filling with white), even in a case where the analysis image 203 is displayed by smoothly (continuously) changing the pixel value to correspond to the treatment progress.

(Configuration of Switching Progress Calculations)

The progress calculation unit 51b (control unit 51) is configured to switch the progress calculated to generate the analysis image 203 based on the operation of the operation unit 52. For example, in this embodiment, the analysis processing unit 51c (control unit 51) is configured to switch between generating the analysis image 203 that identifiably displays the treatment progress distribution based on the attenuation rate of the fluorescence signal and generating the analysis image 203 that identifiably displays the treatment progress distribution based on the attenuation (inclination) of the fluorescence signal per unit time. That is, in this embodiment, the analysis processing unit 51c is configured to change the progress calculation method based on the input operation to the operation unit 52 and generate the analysis image 203 that identifiably displays the treatment progress distribution for each region of the treatment site based on the attenuation of the fluorescence signal acquired along time series per unit time.

Specifically, for example, in a case where the analysis image 203 is displayed by switching the display so as to calculate the progress based on the attenuation per unit time for the treatment progress distribution at the time point T1 in FIG. 6, the progress calculation unit 51b (control unit 51) acquires the difference between the pixel value of the fluorescence image 201 acquired at the time point T1 and the pixel value of the fluorescence image 201 acquired at the time point T2 (see FIG. 6) 30 seconds back from the time point T1. That is, the progress calculation unit 51b acquires the attenuation (difference) for 30 seconds (units of time) immediately before the time point T1 for the fluorescence image 201 acquired at the time point T1, for each pixel of the fluorescence image 201. Then, the progress calculation unit 51b calculates the treatment progress at the time point T1 based on the acquired pixel value difference. That is, the progress calculation unit 51b measures the treatment progress rate for each region of the treatment site by acquiring the fluorescence attenuation per unit time. Here, in photoimmunotherapy, the treatment progress rate (the fluorescence attenuation rate) becomes gradual as the treatment progresses. That is, in the site (region) of the cancer patient 101 where the treatment progress is not sufficient, the fluorescence attenuation per unit time becomes large, and in the site (region) of the cancer patient 101 where the treatment progress is sufficient (completed), the fluorescence attenuation per unit time becomes small.

Then, the analysis processing unit 51c identifiably displays the treatment progress distribution in each region of the treatment site by generating the analysis image 203 to identifiably display the treatment progress rate (fluorescence attenuation rate). Note that even in the case of displaying the analysis image 203 by switching the progress calculation methods, in the same manner as before switching the calculation method, the analysis processing unit 51c generates the analysis image 203 of a stepwise gradation display colored to indicate the treatment progress distribution by the change in hue.

(Superimposed Display of Analysis Image and Visible Image)

Figure 8:
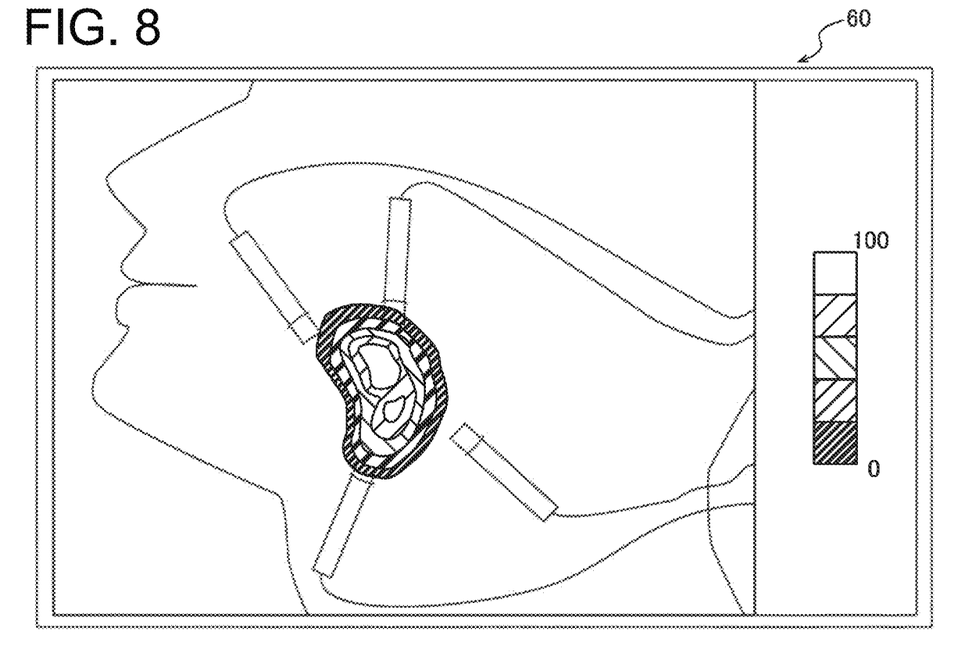
FIG. 8 is a diagram showing one example of a superimposed display of an analysis image and a visible image according to one embodiment.

As shown in FIG. 8, in this embodiment, the image output unit 51d (control unit 51) outputs the generated analysis image 203 and causes the display unit 60 to display the image. Specifically, the image output unit 51d causes the display unit 60 to display the analysis image 203 and the visible image 202 in a superimposed manner. The visible image 202 of the cancer patient 101 is generated by the analysis processing unit 51c based on the visible light captured by the visible light sensor 34.

Then, the image output unit 51d causes the display unit 60 to display the analysis image 203 in which the treatment site region 203a (see FIG. 7) determined as the region corresponding to the treatment site by the region determination unit 51e is colored to correspond to the treatment progress, and the visible image 202, which is a color image.

Specifically, as shown in FIG. 7, the region determination unit 51e (the control unit 51) determines that the region where the intensity of the fluorescence signal at the time point (treatment initiation time point T0) at which acquisition of the fluorescence signal is initiated is larger than a determination threshold for determining the treatment site is the treatment site region 203a. Then, in this embodiment, the analysis processing unit 51c (control unit 51) is configured to acquire, as the treatment site region 203a, the region where the intensity of the fluorescence signal at the time point (treatment initiation time point T0) at which acquisition of the fluorescence signal is initiated is larger than a determination threshold for determining the treatment site, and generate the analysis image 203 such that the region other than the treatment site region 203a out of the analysis image 203 can be identified.

Specifically, the region determination unit 51e acquires the pixel value of each pixel of the fluorescence image 201 at the treatment initiation time point T0, from the fluorescence image 201 at the treatment initiation time point T0 acquired by the signal acquisition unit 51a. Then, the region determination unit 51e acquires the intensity of the fluorescence signal at the treatment initiation time point T0, based on the pixel value of each pixel of the fluorescence image 201 at the treatment initiation time point T0. Then, the region determination unit 51e determines, for example, that the region where the intensity of the fluorescence signal represented by 256 stages of pixel values (luminance values) from 0 to 255 is larger than a determination threshold (for example, 100) for determining the treatment site is the treatment site region 203a.

For example, in a case where there exist no cancer cells at the site of the cancer patient 101 corresponding to the pixel of the fluorescence image 201 at the treatment initiation time point T0, no fluorescence is generated because there exists no medical agent 102. Therefore, in the fluorescence image 201, in the pixel corresponding to the portion where there exist no cancer cells, the pixel value becomes small because the intensity of the detected fluorescence is low. The region determination unit 51e determines that the region where the intensity of the fluorescence at the treatment initiation time point T0 is larger than a determination threshold is the treatment site region 203a to thereby determine that the region corresponding to the position where there exist cancer cells of the cancer patient 101 in the fluorescence image 201 is the treatment site region 203a.

Then, the analysis processing unit 51c acquires the treatment site region 203a determined by the region determination unit 51e. The analysis processing unit 51c is configured to mask such that the region other than the acquired treatment site region 203a is not subjected to the progress calculation processing when generating the analysis image 203. That is, the progress calculation unit 51b calculates, based on the acquired treatment site region 203a, the progress calculation processing only for the pixels corresponding to the treatment site region 203a in the analysis image 203. Further, the analysis processing unit 51c generates the analysis image 203 such that the region other than the treatment site region 203a becomes transmittable (becomes transparent).

In this way, as shown in FIG. 8, the image output unit 51d causes the display unit 60 to display the analysis image 203 in which the treatment site region 203a is colored to correspond to the treatment progress and the region other than the treatment site region 203a has become transmittable, and the visible image 202, which is a color image, in a superimposed manner.

Note that the generation and display of the analysis image 203 by the control unit 51 may be performed in real time in synchronization with the progress of the treatment, or may be performed by acquiring the fluorescence image 201 (fluorescence signal) stored in the storage unit 42 after the end of the treatment. That is, the control unit 51 may be configured to generate the analysis image 203 as a moving image by, for example, acquiring the fluorescence signal (fluorescence image 201) every 100 ms (milliseconds) to generate the analysis image 203 in synchronization with the progress of the treatment. Further, the control unit 51 may generate the analysis image 203 as one still picture based on the fluorescence image 201 acquired at the treatment end time point.

(Effects of this Embodiment)

In this embodiment, the following effects can be obtained.

In this embodiment, the analysis image 203 that identifiably displays the treatment progress distribution for each region of the treatment site based on the acquired time-series changes in the fluorescence signal is generated. Then, the generated analysis image 203 is output. With this, even in a case where the treatment progress differs for each region of the treatment site, the treatment progress distribution based on the time-series changes in the fluorescence can be identified by the display of the analysis image 203. Therefore, unlike the case where a person directly confirms the image indicating the intensity of the fluorescence signal, it is possible to easily identify the treatment progress distribution for each region of the treatment site by visually recognizing the analysis image 203. Consequently, it is possible to provide a treatment support system and a treatment support device capable of easily recognizing the treatment progress for each region of the treatment site of the cancer patient 101 (subject).

Further, in the treatment support system 100 according to the above-described embodiment, the following further effects can be acquired by configuring as follows.

That is, in this embodiment, as described above, the analysis processing unit 51c (control unit 51) is configured to generate the analysis image 203 such that the pixel value of each of the pixels in the analysis image 203 corresponds to the treatment progress distribution for each region of the treatment site. With this configuration, by visually recognizing each of the pixels in the analysis image 203, it is possible to identify the treatment progress in the treatment site corresponding to each of the pixels in the analysis image 203 in detail. Therefore, by visually recognizing the analysis image 203, it is possible to more specifically identify the treatment progress of each region of the treatment site of the cancer patient 101 (subject).

Further, in this embodiment, as described above, the analysis processing unit 51c (control unit 51) is configured to generate the analysis image 203 that identifiably displays the treatment progress distribution for each region of the treatment site, based on the attenuation rate of the fluorescence signal acquired along time series, with reference to the time point at which acquisition of the fluorescence signal is initiated. With this configuration, even in a case where the intensity of the fluorescence signal at the time point at which the treatment is initiated differs due to the difference in the body part of the cancer patient 101 (subject) or the cancer type, and the like, unlike the case where the treatment progress is calculated (acquired) based on the absolute magnitude of the intensity of the fluorescence signal, it is possible to appropriately acquire the treatment progress distribution by acquiring the attenuation rate with reference to the time point at which acquisition of the fluorescence signal is initiated. Therefore, based on the attenuation rate of the fluorescence signal, it is possible to easily generate the analysis image 203 that appropriately displays the treatment progress distribution in an identifiable manner.

Further, in this embodiment, as described above, the analysis processing unit 51c (control unit 51) is configured to generate the analysis image 203 that identifiably displays the treatment progress distribution for each region of the treatment site based on the attenuation of the fluorescence signal acquired along the time series per unit time. Here, due to the difference in the body part of the cancer patient 101 (subject) and the cancer type, in some cases, the intensity of the fluorescence signal is relatively low even when the treatment has been completed. In such a case, even when the treatment has been completed, the change in the attenuation rate of the fluorescence signal becomes small, and therefore it becomes difficult to identify the treatment progress based on the attenuation rate of the fluorescence signal. On the other hand, in this embodiment, the analysis processing unit 51c (control unit 51) is configured to generate the analysis image 203 that identifiably displays the treatment progress distribution for each region of the treatment site, based on the attenuation of the fluorescence signal acquired along time series per unit time. According to this configuration, in a case where the attenuation (attenuation rate) per unit time is relatively large, it is possible to identify that it is in a state in which the treatment is progressing, and in a case where the attenuation (attenuation rate) per unit time is relatively small, it is possible to identify that it is in a state in which the treatment is not progressing (completed). That is, it is possible to identify such that in a case where the fluorescence attenuation rate is large, the treatment is being performed, while in a case where the treatment progress is small, the treatment has been completed, and the progress is large. Therefore, in each region of the treatment site, by generating the analysis image 203 based on the attenuation (attenuation rate) per unit time, it is possible to easily identify the treatment progress (progress rate) of each region of the treatment site from the generated analysis image 203. Consequently, even in a case where the intensity attenuation of the fluorescence signal with the progress of the treatment is relatively small, it is possible to easily identify the treatment progress of each region of the treatment site by the analysis image 203 generated based on the attenuation of the fluorescence signal per unit time.

Further, in this embodiment, as described above, the analysis processing unit 51c (control unit 51) is configured to generate the analysis image 203 of the stepwise gradation display to indicate the treatment progress distribution for each region of the treatment site in a stepwise manner. With this configuration, the treatment progress can be identified by the stepwise display in each region of the treatment site. Therefore, unlike the case where the treatment progress is displayed by fine and continuous classification, it is possible to macroscopically identify the progress of the entire treatment site. Consequently, it is possible to prevent the treatment progress distribution in the analysis image 203 from becoming a complicated display to thereby result in deteriorated visibility due to the fact that the treatment progress of the treatment site is finely classified.

Further, in this embodiment, as described above, the analysis processing unit 51c (control unit 51) is configured to generate the analysis image 203 colored to correspond to the treatment progress distribution for each region of the treatment site. With this configuration, since the visibility of the treatment progress distribution in the analysis image 203 is improved by being colored, it is possible to more easily identify the treatment progress distribution for each region of the treatment site.

Also, in this embodiment, as described above, the analysis processing unit 51c (control unit 51) is configured to generate the analysis image 203 colored to indicate the treatment progress distribution for each region of the treatment site by the change in hue. With this configuration, since the treatment progress distribution is colored to indicate the treatment progress distribution by the change in hue, it is possible to identify the difference in treatment progress by the difference in color of the analysis image 203. For this reason, by visually recognizing the color difference of the analysis image 203, it is possible to more easily identify the difference in the treatment progress.

Further, in this embodiment, as described above, the analysis processing unit 51c (control unit 51) is configured to acquire at least one of the attenuation rate of the fluorescence signal acquired along time series and the attenuation of the fluorescence signal per unit time as a value indicating the treatment progress and generate the analysis image 203 that identifiably displays the region where the treatment has been completed in a case where the value indicating the treatment progress exceeds a completion threshold indicating the treatment completion in each region of the treatment site. With this configuration, since the analysis image 203 is generated such that the region where the treatment has been completed can be identified, it is possible to easily identify the region where the treatment has been completed out of each region of the treatment site by visually recognizing the analysis image 203.

Further, in this embodiment, as described above, the analysis processing unit 51c (control unit 51) is configured to acquire, as the treatment site region 203a, the region where the intensity of the analysis image at the time point at which acquisition of the fluorescence signal is initiated is larger than a determination threshold for determining the treatment site and generate the analysis image 203 such that the region other than the treatment site region 203a can be identified from the analysis image 203. With this configuration, it is possible to acquire the region where fluorescence occurs as the treatment site region 203a. That is, it is possible to acquire the region where the medical agent 102 exists due to the presence of cancer cells as the treatment site region 203a. Therefore, since it is possible to prevent the region where fluorescence does not occur from being acquired as the treatment site region 203a, it is possible to generate the analysis image 203 to selectively indicate the change in the fluorescence signal in the treatment site. Consequently, in the analysis image 203, it is possible to prevent the visibility of the treatment progress distribution from being deteriorated in the analysis image 203 due to the fact that the change in the fluorescence signal in the region other than the treatment site is displayed.

Further, in this embodiment, as described above, it is further provided with the operation unit 52 configured to accept an operation of switching between generating the analysis image 203 that identifiably displays the treatment progress distribution based on the attenuation rate of the fluorescence signal and generating the analysis image 203 that identifiably displays the treatment progress distribution based on the attenuation of the fluorescence signal per unit time. With this configuration, it is possible to easily select the processing for generating the analysis image 203 by the operation of the operation unit 52 in accordance with the difference between the body parts of the cancer patient 101 (subject) and the cancer types. Thus, it is possible to easily switch to an appropriate display to identify the treatment progress distribution by changing the processing for generating the analysis image 203.

Further, in this embodiment, as described above, it is further provided with the visible light sensor 34 (imaging unit) for imaging visible light. The signal acquisition unit 51a (control unit 51) is configured to acquire the visible light signal of the visible light imaged by the visible light sensor 34. The analysis processing unit 51c (visible image 51) is configured to generate the visible image 202 of the cancer patient 101 (subject) based on the visible light captured by the visible light sensor 34. The image output unit 51d (control unit 51) is configured to cause the display unit 60 to display the analysis image 203 and the visible image 202 in a superimposed manner. With this configuration, it is possible to easily identify the treatment progress in the actual treatment site of the cancer patient 101 by visually recognizing the visible image 202 and the analysis image 203, which are displayed in a superimposed manner.

[Modified Embodiments]

It should be understood that the embodiments disclosed here are examples in all respects and are not restrictive. The scope of the present invention is indicated by the appended claims rather than by the description of the above-described embodiments and includes all modifications (changes) within the meanings and the scopes equivalent to the claims.

For example, in the above-described embodiment, an example is shown in which the analysis image 203 is generated such that the pixel value of each of pixels in the analysis image 203 corresponds to the treatment progress distribution for each region of the treatment site, but the present invention is not limited thereto. For example, it may be configured such that the analysis image is generated to display the treatment progress distribution by determining a plurality of pixels of the analysis image as one region and measuring the fluorescence intensity for each defined region.

Further, in the above-described embodiment, an example is shown in which the analysis processing unit 51c (control unit 51) is configured to generate the analysis image 203 that identifiably displays the treatment progress distribution for each region of the treatment site based on the attenuation rate of the acquired time-series fluorescence signal with reference to the time point at which acquisition of the fluorescence signal is initiated, but the present invention is not limited thereto. For example, the attenuation rate may be measured based on the time point at which irradiation of the fluorescence signal is initiated instead of the time point at which acquisition of the fluorescence signal is initiated. Further, the attenuation rate of the fluorescence signal may be measured with reference to the time point at which a predetermined time (for example, one second) has elapsed from the time point at which irradiation of the fluorescence signal is initiated.

Further, in the above-described embodiment, an example is shown in which the analysis processing unit 51c (control unit 51) is configured to generate the analysis image 203 that identifiably displays the treatment progress distribution for each region of the treatment site based on the attenuation of the acquired time-series fluorescence signal per unit time, but the present invention is not limited thereto. For example, based on the integrated value of the acquired fluorescence signal, an analysis image that identifiably displays the treatment progress distribution for each region of the treatment site may be generated. Further, an analysis image identifiably displays the treatment progress distribution for each region of the treatment site may be generated based on the difference value of the attenuations of the acquired fluorescence signals.

Further, in the above-described embodiment, an example is shown in which the analysis processing unit 51c (control unit 51) is configured to generate the analysis image 203 colored to indicate the treatment progress distribution for each region of the treatment site by the change in hue, but the present invention is not limited thereto. For example, an analysis image may be generated to be colored by the same hue without changing the hue.

Further, in the above-described embodiment, an example is shown in which the analysis processing unit 51c (control unit 51) is configured to generate the analysis image 203 to be identifiably displayed as a region where the treatment has been completed in a case where the value indicating the treatment progress exceeds a completion threshold for indicating the treatment completion in each region of the treatment site, but the present invention is not limited thereto. For example, it may be configured to generate the analysis image such that the region indicating the completion of the treatment is not identifiably displayed. Further, an initiation threshold for indicating the treatment initiation may be provided. That is, it may be configured to generate an analysis image such that the region where the value indicating the treatment progress exceeds the initiation threshold can be identified as a region where the treatment is initiated and that a region where the value indicating the treatment progress does not exceed the initiation threshold can be identified as a region where the treatment has not yet initiated.

Further, in the above-described embodiment, an example is shown in which the analysis processing unit 51c (control unit 51) is configured to acquire, as the treatment site region 203a, the region where the fluorescence signal intensity at the time point at which acquisition of the fluorescence signal is initiated is larger than a discrimination threshold for identifying the site to be treated as the treatment site region 203a and generate the analysis image 203 that can identify the region other than the treatment site region 203a from the analysis image 203, but the present invention is not limited thereto. For example, the treatment site region may be acquired based on the intensity of the fluorescence signal at the time point at which a predetermined time (for example, 0.5 seconds) has elapsed from the time point at which acquisition of the fluorescence signal is initiated. Further, it may be configured such that a specific region of the generated analysis image or visible image is designated as a treatment site region based on a selection operation on the operation unit by the user, such as, e.g., a doctor.

Further, in the above-described embodiment, an example is shown in which it is further provided with the operation unit 52 that accepts an operation for switching between generating the analysis image 203 that identifiably displays the treatment progress distribution based on the attenuation rate of the fluorescence signal and generating the analysis image 203 that identifiably displays the treatment progress distribution based on the attenuation of the fluorescence signal per unit time, but the present invention is not limited thereto. For example, it may be configured to display two types of fluorescence images i.e., an analysis image that identifiably displays the treatment progress distribution based on the attenuation rate of the fluorescence signal and an analysis image that identifiably displays the treatment progress based on the attenuation of the fluorescence signal per unit time, side by side, Further, in the above-described embodiment, an example is shown in which the image output unit 51d (control unit 51) is configured to cause the display unit 60 to display the analysis image 203 and the visible image 202 in a superimposed manner, but the present invention is not limited thereto. For example, it may be configured such that the analysis image and the visible image are displayed side by side. Alternatively, it may be configured such that only the analysis image is displayed without displaying the visible image.

In the above-described embodiment, an example is shown in which the imaging unit (visible light sensor 34) for imaging visible light is integrally provided with the light detection unit 30 (fluorescence sensor 33) for detecting fluorescence, but the present invention is not limited thereto. For example, it may be configured to separately provide an imaging unit for imaging visible light and a light detection unit (fluorescence sensor) for detecting fluorescence.

Further, in the above-described embodiment, an example is shown in which the analysis image 203 is color-coded by five colors to represent the treatment progress distribution in a stepwise manner, but the present invention is not limited thereto. For example, it may be configured such that the analysis image may be color-coded by six or more colors, or may be color-coded by four or less colors.

Further, in the above-described embodiment, an example is shown in which the analysis processing unit 51c (control unit 51) is configured to calculate the progress (progress rate) based on the attenuation of fluorescence for 30 seconds when calculating the progress based on the attenuation per unit time, but the present invention is not limited thereto. For example, it may be configured such that the treatment progress (progress rate) is calculated based on the fluorescence attenuation for 10 seconds, 1 second, or 0.1 seconds. Further, it may be configured to acquire the attenuation per unit time by averaging the differences of pixel values in a plurality of fluorescence images acquired per unit time.

In the above-described embodiment, an example is shown in which the control unit 51 and the device control unit 43 are separately provided, but the present invention is not limited thereto. For example, it may be configured such that a common control unit (controller) performs the control of the operation of each part of the treatment support device and the processing of generating an analysis image based on the acquired fluorescence signal. Further, the control unit may be configured to control the acquisition of the signal from the light detection unit. That is, the control unit (PC) may be configured to directly acquire the fluorescence signal and the visible light signal by directly connecting the light detection unit and the control unit.

Further, in the above-described embodiment, an example is shown in which the control unit 51 includes, as a functional configuration (software configuration) of the control unit 51, the signal acquisition unit 51a, the progress calculation unit 51b, the analysis processing unit 51c, the image output unit 51d, and the region determination unit 51e, but the present invention is not limited thereto. For example, each of the signal acquisition unit, the progress calculation unit, the analysis processing unit, the image output unit, and the region determination unit may be configured as separate hardware (arithmetic circuit).

In the above-described embodiment, an example is shown in which the signal acquisition unit 51a, the progress calculation unit 51b, the analysis processing unit 51c, the image output unit 51d, and the region determination unit 51e are configured as functional blocks of one control unit 51 (CPU), but the present invention is not limited thereto. For example, the signal acquisition unit, the progress calculation unit, the analysis processing unit, image output unit, and the region determination unit may be configured as functional blocks of two or more control units. That is, the progress calculation unit and the analysis processing unit may be configured as functional blocks of separate control units.

Further, in the above-described embodiment, an example is shown in which the irradiation unit 10 is configured to initiate and end therapeutic light irradiation based on the signal from the device control unit 43 of the treatment support device 20, but the present invention is not limited thereto. For example, the irradiation of the therapeutic light may be initiated and ended based on an input operation to the operation unit for operating the irradiation unit. In such cases, a signal instructing the initiation and the end of the irradiation unit may be output from the device control unit or the control unit of the treatment support device, and the detection of the fluorescence may be initiated or ended based on the signal from the irradiation unit. Further, without receiving a signal for initiating and ending the irradiation of the treatment light on the treatment support device side, the fluorescence detection may be initiated based on an operation by the operation unit.

Further, in the above-described embodiment, an example is shown in which the display unit 60 is configured to display the analysis image 203 generated by the analysis processing unit 51c (control unit 51), but the present invention is not limited thereto. For example, it may be configured to display the fluorescence image and the visible image generated by the image collection unit on the display unit.

In the above-described embodiment, an example is shown in which the irradiation unit 10 (treatment probe 12) emits the therapeutic light within the body of the cancer patient 101 (subject), but the present invention is not limited thereto. For example, it may be configured to emit therapeutic light from outside the body.

[Aspects]

It will be understood by those skilled in the art that the above-described exemplary embodiments are concrete examples of the following aspects.

(Item 1)

A treatment support system comprising:
an irradiation unit configured to irradiate a medical agent administered to a treatment site in a body of a subject with therapeutic light in a predetermined wavelength range in treatment, the medical agent containing a fluorescent material, the treatment being performed to kill cancer cells by irradiating the medical agent with the therapeutic light;
a light detection unit configured to detect fluorescence emitted from the fluorescent material of the medical agent excited by the therapeutic light emitted from the irradiation unit;
a control unit configured to analyze a fluorescence signal of the fluorescence detected by the light detection unit to generate an analysis image; and
a display unit configured to display the analysis image generated by the control unit,
wherein the control unit includes:
a signal acquisition unit configured to acquire the fluorescence signal detected by the light detection unit;
an analysis processing unit configured to generate the analysis image based on time-series changes of the fluorescence signal acquired by the signal acquisition unit, the analysis image displaying a treatment progress distribution for each region of the treatment site in an identifiable manner; and
an image output unit configured to output the analysis image generated by the analysis processing unit.

(Item 2)

The treatment support system as recited in the above-described Item 1,
wherein the analysis processing unit is configured to generate the analysis image such that each pixel value of pixels in the analysis image corresponds to the treatment progress distribution for each region of the treatment site.

(Item 3)

The treatment support system as recited in the above-described Item 1 or 2,
wherein the analysis processing unit is configured to generate the analysis image, the analysis image displaying the treatment progress distribution for each region of the treatment site in an identifiable manner based on an attenuation rate of the fluorescence signal acquired along time series with reference to a time point at which acquisition of the fluorescence signal is initiated.

(Item 4)

The treatment support system as recited in any one of the above-described Items 1 to 3,
wherein the analysis processing unit is configured to generate the analysis image, the analysis image displaying the treatment progress distribution for each region of the treatment site in an identifiable manner based on attenuation of the fluorescence signal acquired along time series per unit time.

(Item 5)

The treatment support system as recited in any one of the above-described Items 1 to 4,
wherein the analysis processing unit is configured to generate the analysis image of a stepwise gradation display such that the treatment progress distribution for each region of the treatment site is shown in a stepwise manner.

(Item 6)

The treatment support system as recited in any one of the above-described Items 1 to 5,
wherein the analysis processing unit is configured to generate the analysis image colored to correspond to the treatment progress distribution for each region of the treatment site.

(Item 7)

The treatment support system as recited in the above-described Item 6,
wherein the analysis processing unit is configured to generate the analysis image colored to indicate the treatment progress distribution for each region of the treatment site by a change in hue.

(Item 8)

The treatment support system as recited in any one of the above-described Items 1 to 7,
acquire at least one of an attenuation rate of the fluorescence signal acquired along time series and attenuation of the fluorescence signal per unit time, and
generate the analysis image showing a treatment completed region in an identifiable manner in a case where a value indicating treatment progress exceeds a completion threshold indicating treatment completion in each region of the treatment site.

(Item 9)

The treatment support system as recited in any one of the above-described Items 1 to 8,
wherein the analysis processing unit is configured to acquire a region where intensity of the fluorescence signal at a time point at which acquisition of the fluorescence signal is initiated is larger than a determination threshold for determining a site to be treated, as a treatment site region, and generate the fluorescence signal to be able to identify a region other than the treatment site region out of the analysis image.

(Item 10)

The treatment support system as recited in any one of the above-described Items 1 to 9, further comprising:

an operation unit configured to accept a switching operation for switching between generating the analysis image that identifiably displays the treatment progress distribution based on an attenuation rate of the fluorescence signal and generating the analysis image that identifiably displays the treatment progress distribution based on attenuation of the fluorescence signal per unit time.

(Item 11)

The treatment support system as recited in any one of the above-described Items 1 to 10, further comprising:

an imaging unit configured to image visible light, wherein the signal acquisition unit is configured to acquire a visible light signal of the visible light imaged by the imaging unit, wherein the analysis processing unit is constituted to acquire a visible image of the subject based on the visible light imaged by the imaging unit, and wherein the image output unit is configured to cause the display unit to display the analysis image and the visible image in a superimposed manner.

(Item 12)

A treatment support device comprising:

a light detection unit configured to detect fluorescence emitted from a fluorescent material of a medical agent administered to a treatment side in a body of a subject by being excited by therapeutic light in a predetermined wavelength range in a treatment for killing cancer cells by irradiating the medical agent with the therapeutic light; and a control unit configured to generate an analysis image by analyzing a fluorescence signal detected by the light detection unit, wherein the control unit includes:

a signal acquisition unit configured to acquire the fluorescence signal detected by the light detection unit;

an analysis processing unit configured to generate the analysis image that identifiably displays a treatment progress distribution for each region of the treatment site based on time-series changes of the fluorescence signal acquired by the signal acquisition unit; and an image output unit configured to output the analysis image generated by the analysis processing unit.

DESCRIPTION OF SYMBOLS

10: Irradiation unit
20: Treatment support device
30: Light detection unit
34: Visible light sensor (imaging unit)
51: Control unit
  51a: Signal acquisition unit
  51c: Analysis processing unit
  51d: Image output unit
52: Operation Unit
60: Display unit
100: Treatment support system
101: Cancer patient (subject)
102: Medical agent
202: Visible image
203: Analysis image
  203a: Treatment site region

The invention claimed is:

1. A treatment support system comprising:

an irradiator configured to irradiate a medical agent administered to a treatment site in a body of a subject with therapeutic light in a predetermined wavelength range in treatment, the medical agent containing a fluorescent material, the treatment being performed to kill cancer cells by irradiating the medical agent with the therapeutic light;

a light detector configured to detect fluorescence emitted from the fluorescent material of the medical agent excited by the therapeutic light emitted from the irradiator;

a controller configured to analyze a fluorescence signal of the fluorescence detected by the light detector to generate an analysis image; and a display configured to display the analysis image generated by the controller, wherein the controller includes:

a signal acquirer configured to acquire the fluorescence signal detected by the light detector;

an analysis processor configured to generate the analysis image based on time-series changes of the fluorescence signal acquired by the signal acquirer, the analysis image displaying a treatment progress distribution for each region of the treatment site in an identifiable manner; and an image outputter configured to output the analysis image generated by the analysis processor, and where the analysis processor is configured to generate the analysis image, the analysis image displaying the treatment progress distribution for each region of the treatment site in an identifiable manner based on comparison of an intensity of the fluorescence signal at a predetermined time point to an intensity of the fluorescence signal acquired along time series.

2. The treatment support system as recited in claim 1, wherein the analysis processor is configured to generate the analysis image such that each pixel value of pixels in the analysis image corresponds to the treatment progress distribution for each region of the treatment site.

3. The treatment support system as recited in claim 1, wherein the analysis processor is configured to generate the analysis image, the analysis image displaying the treatment progress distribution for each region of the treatment site in an identifiable manner based on an attenuation rate of the fluorescence signal acquired along time series with reference to a time point at which acquisition of the fluorescence signal is initiated.

4. The treatment support system as recited in claim 1, wherein the analysis processor is configured to generate the analysis image based on attenuation of the fluorescence signal acquired along time series per unit time, the analysis image displaying the treatment progress distribution for each region of the treatment site in an identifiable manner.

5. The treatment support system as recited in claim 1, wherein the analysis processor is configured to generate the analysis image of a stepwise gradation display such that the treatment progress distribution for each region of the treatment site is shown in a stepwise manner.

6. The treatment support system as recited in claim 1, wherein the analysis processor is configured to generate the analysis image colored to correspond to the treatment progress distribution for each region of the treatment site.

7. The treatment support system as recited in claim 6, wherein the analysis processor is configured to generate the analysis image colored to indicate the treatment progress distribution for each region of the treatment site by a change in hue.

8. The treatment support system as recited in claim 1, wherein the analysis processor is configured to
acquire at least one of an attenuation rate of the fluorescence signal acquired along time series and attenuation of the fluorescence signal per unit time, and
generate the analysis image showing a treatment completed region in an identifiable manner in a case where a value indicating treatment progress exceeds a completion threshold indicating treatment completion in each region of the treatment site.

9. The treatment support system as recited in claim 1, wherein the analysis processor is configured to
acquire a region where intensity of the fluorescence signal at a time point at which acquisition of the fluorescence signal is initiated is larger than a determination threshold for determining a site to be treated, as a treatment site region, and
generate the fluorescence signal to be able to identify a region other than the treatment site region out of the analysis image.

10. The treatment support system as recited in claim 1, further comprising:
an imager configured to image visible light,
wherein the signal acquirer is configured to acquire a visible light signal of the visible light imaged by the imager,
wherein the analysis processor is constituted to acquire a visible image of the subject based on the visible light imaged by the imager, and
wherein the image outputter is configured to cause the display to display the analysis image and the visible image in a superimposed manner.

11. A treatment support system comprising:
an irradiator configured to irradiate a medical agent administered to a treatment site in a body of a subject with therapeutic light in a predetermined wavelength range in treatment, the medical agent containing a fluorescent material, the treatment being performed to kill cancer cells by irradiating the medical agent with the therapeutic light;
a light detector configured to detect fluorescence emitted from the fluorescent material of the medical agent excited by the therapeutic light emitted from the irradiator;
a controller configured to analyze a fluorescence signal of the fluorescence detected by the light detector to generate an analysis image; and
a display configured to display the analysis image generated by the controller,
wherein the controller includes:
a signal acquirer configured to acquire the fluorescence signal detected by the light detector;
an analysis processor configured to generate the analysis image based on time-series changes of the fluorescence signal acquired by the signal acquirer, the analysis image displaying a treatment progress distribution for each region of the treatment site in an identifiable manner;
an image outputter configured to output the analysis image generated by the analysis processor; and
wherein the treatment su ort Sys further comprises an operation acceptor configured to accept a switching operation for switching between generating the analysis image that identifiably displays the treatment progress distribution based on an attenuation rate of the fluorescence signal and generating the analysis image that identifiably displays the treatment progress distribution based on attenuation of the fluorescence signal per unit time.

12. A treatment support device comprising:
a light detector configured to detect fluorescence emitted from a fluorescent material of a medical agent administered to a treatment site in a body of a subject by being excited by therapeutic light in a predetermined wavelength range in a treatment for killing cancer cells by irradiating the medical agent with the therapeutic light; and
a controller configured to generate an analysis image by analyzing a fluorescence signal detected by the light detector,
wherein the controller includes:
a signal acquirer configured to acquire the fluorescence signal detected by the light detector;
an analysis processor configured to generate the analysis image that identifiably displays a treatment progress distribution for each region of the treatment site based on time-series changes of the fluorescence signal acquired by the signal acquirer; and
an outputter configured to output the analysis image generated by the analysis processor, and
wherein the analysis processor is configured to generate the analysis image, the analysis image displaying the treatment progress distribution for each region of the treatment site in an identifiable manner based on comparison of an intensity of the fluorescence signal at a predetermined time point to an intensity of the fluorescence signal acquired along time series.

* * * * *